(12) United States Patent
Bader

(10) Patent No.: US 6,307,276 B1
(45) Date of Patent: Oct. 23, 2001

(54) METHOD FOR OPERATING A PARALLEL HYBRID DRIVE FOR A VEHICLE

(75) Inventor: Christian Bader, Boeblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/486,563

(22) PCT Filed: Aug. 7, 1998

(86) PCT No.: PCT/EP98/05021
§ 371 Date: Feb. 29, 2000
§ 102(e) Date: Feb. 29, 2000

(87) PCT Pub. No.: WO99/11481
PCT Pub. Date: Mar. 11, 1999

(30) Foreign Application Priority Data

Aug. 29, 1997 (DE) .............................................. 197 37 791

(51) Int. Cl.⁷ ..................................................... F02N 11/06
(52) U.S. Cl. .................. 290/40 C; 290/40 A; 290/40 B; 290/40 R; 290/40 D; 290/4 R; 180/65.2; 180/65.3; 180/65.4
(58) Field of Search ................................ 290/40 A–40 F; 180/65.2, 65.3, 65.4; 318/139, 146, 151

(56) References Cited

U.S. PATENT DOCUMENTS

| 5,586,613 | * | 12/1996 | Ehsani | 180/65.2 |
|---|---|---|---|---|
| 5,653,302 | | 8/1997 | Edye et al. | 180/65.2 |
| 5,788,004 | * | 8/1998 | Friedmann et al. | 180/65.2 |
| 5,789,881 | * | 8/1998 | Egami et al. | 318/139 |
| 5,806,617 | * | 9/1998 | Yamaguchi | 180/65.2 |
| 5,903,061 | * | 5/1999 | Tsuzuki et al. | 290/40 C |

FOREIGN PATENT DOCUMENTS

| 41 13 386 A1 | 10/1992 | (DE) . |
|---|---|---|
| W 95/32100 | 11/1995 | (WO) . |

* cited by examiner

*Primary Examiner*—Elvin Enad
(74) *Attorney, Agent, or Firm*—Crowell & Moring LLP

(57) ABSTRACT

In a method for operating a parallel motor vehicle hybrid drive, with an internal combustion engine which is connected to a drive shaft via a clutch and a manual transmission, and with a three-phase machine which is directly coupled with its rotor to a countershaft of the manual transmission and is connected to an electrical energy store via a three-phase converter, a time average of the driving torque required during a respective predeterminable travel time interval is determined by a hybrid drive control unit. The power outputs of the internal combustion engine and of the three-phase machine are controlled so that the internal combustion engine outputs driving torque corresponding to the time average determined, and the three-phase machine outputs the difference between the driving torque currently required and the driving torque delivered by the internal combustion engine.

6 Claims, 2 Drawing Sheets

METHOD FOR OPERATING A PARALLEL HYBRID DRIVE FOR A VEHICLE

This application claims the priority of Germany patent document 197 37 791.2, filed Aug. 29, 1997 and PCT International Application No. PCT/EP98/05021, filed Aug. 7, 1998, the disclosures of which is expressly incorporated by reference herein.

BACKGROUND AND SUMMARY OF THE INVENTION

The invention relates to a method for operating a parallel hybrid drive for a motor vehicle having an internal combustion engine connected to a drive shaft via a clutch and a manual transmission, and a three-phase machine with a rotor which is directly coupled to a countershaft of the manual transmission, and which is connected to an electrical energy storage unit via a three-phase converter.

A hybrid drive of this type for a motor vehicle is disclosed in German patent document DE 42 02 083 A1. In addition to the three conventional operating modes of the hybrid drive (one or the other of the two drive units used alone, or both used together), it is proposed to employ the three-phase machine as a synchronization aid for the manual transmission during gear changing.

Preliminary publication DT 23 53 724 discloses a parallel hybrid drive in which a heat engine is operated in a fixed rotational speed relationship with a gyro energy storage unit and, together with an electrical machine, can be coupled to a power-split gear. The power capacity of the electrical machine is dimensioned appreciably lower than that of the gyro storage unit and the heat engine. The heat engine is to be operated in favourable characteristic map ranges and is to be regulated with delayed action (that is, slowly). Brief deviations in the power required from the hybrid drive are covered by the gyro storage unit and the electrical machine.

German patent document DE 44 22 636 A1 discloses a method for automatically controlling a parallel hybrid drive, in which the power of an internal combustion engine is supplied in three different ways as a function of current driving parameters; in particular the power requirement, the vehicle speed and the battery charge state. Various special values to be determined serve as evaluation criteria, including power limits of the drives and of the battery and also speed limit values. The internal combustion engine is operated as a function of these criteria. At the same time, in principle, the supply of power by the internal combustion engine is to be minimized for reasons of exhaust-gas emissions, without the elasticity of the overall unit being restricted so as to impair driving comfort.

The publication by B. Giera, et al., "Hybridantrieb mit Gryo-Komponente für wirtschaftliche und dynamische Betriebsweise" ["Hybrid drive with gyro component for efficient and dynamic operation"], ETZ-A No. 94 (1973), page 653, describes a hybrid drive with an internal combustion engine, a gyro component and an electric motor. The electric motor is connected to a first input of a variable-ratio differential gear, while a second input of the latter has coupled to it the internal combustion engine and the gyro component connected in parallel to the latter by means of a step-up. The output of this differential gear is connected via a manual transmission to a conventional differential gear of the driving axle. For emissions reasons, the power output of the internal combustion engine is regulated only very slowly, in a desensitized manner. The maximum specific power of the gyro component is selected to approximate a multiple of that of the internal combustion engine, which, in turn, is typically about twice as high as that of the electric motor.

German patent document DE 44 22 647 A1 discloses a method for automatic control of the supply of power by an internal combustion engine and/or by an electric motor capable of being driven via an electrical energy store, in motor vehicles with a hybrid drive. When the required drive power is no higher than a predetermined basic power, it is supplied solely by the internal combustion engine; however, in operating phases in which the required drive power is higher than the predetermined basic power, if the electrical energy store is sufficiently charged, some of the drive power is supplied additionally by the electric motor. Preferably, the predetermined basic power is the maximum power output of the internal combustion engine as a function of the rotational speed prevailing in each case. When the required drive power is lower than the predetermined basic power and the electrical energy storage unit is not sufficiently charged, excess power is supplied by the internal combustion engine in order to charge the electrical energy store.

The journal article by P. Chudi and A. Malmquist, Schadstoffarmes Hybridtriebwerk für moderne Lastkraftwagen und Omnibusse [Low-pollutant hybrid engine for modern heavy goods vehicles and buses], ABB Technik 6/7, 1996, page 12, discloses a serial hybrid drive of special design, as well as a suitable operating mode. A gas turbine is provided as the internal combustion engine. In order to control the hybrid drive, a vehicle management computer detects and integrates the instantaneous power requirement to determine an average power requirement for the electric drive motor. The desired value for the gas turbine power is then set equal to the sum of this average power requirement of the electric drive motor and a power component for recharging batteries functioning as electrical energy storage units. A high-speed generator is coupled mechanically to the gas turbine. The electric drive motor is then connected electrically, on the one hand, to the high-speed generator and, on the other hand, to the batteries chargeable by the latter, so that the motor is fed in parallel by the high-speed generator, together with the coupled gas turbine, and by the batteries.

One object of the present invention is to provide a method for operating a parallel hybrid drive of the type described above which ensures by the simplest possible means that the internal combustion engine is operated with emissions which are as low as possible.

This object is achieved by the method according to the invention, in which a time average of the driving torque required during a respective predeterminable travel time interval is determined by control, and is demanded as load from the internal combustion engine. The difference between the driving torque thus delivered by the internal combustion engine and the driving torque currently required is made available or absorbed by the three-phase machine, which is connected via a three-phase converter to an electrical energy storage unit. Drive energy required for a short time can thus be extracted from the storage unit and stored intermediately in the braking energy. With continuous sliding averaging of the required driving torque, load jumps are transmitted to the internal combustion engine without delay, but in a leveled manner; if appropriate, the three-phase motor supplies the resulting brief power demand peaks. As a result, the internal combustion engine is operated in a desensitized manner, and the extent of desensitization can be set by a suitable choice of the length of the travel time interval used for averaging.

In one embodiment of the method according to the invention, the travel time interval for averaging is determined as a function of the emission behaviour of the internal combustion engine under load changes and/or of the current operating state of the latter. It is selected sufficiently large that, in the case of a given maximum load jump, the load change of the internal combustion engine (and therefore the pollutant emissions) do not exceed a specific tolerance value. The travel time interval may be fixed in this manner, separately for a plurality of operating states of the internal combustion engine, since the actual absolute load on the internal combustion engine is of greatest importance. Since the timespan of typical acceleration operations of a vehicle in town traffic (particularly a commercial vehicle) is generally on the order of magnitude of 15 s, the travel time interval for averaging is selected preferably on this order of magnitude.

According to another embodiment of the invention, during constant travel with the internal combustion engine is operated below full load, the electrical storage unit is charged because the internal combustion engine delivers power greater than necessary for the driving mode. Energy conversion losses can thereby be compensated so as to save fuel.

Other objects, advantages and novel features of the present invention will become apparent from the following detailed description of the invention when considered in conjunction with the accompanying drawings.

DETAILED DESCRIPTION OF THE DRAWINGS

Figure 1:
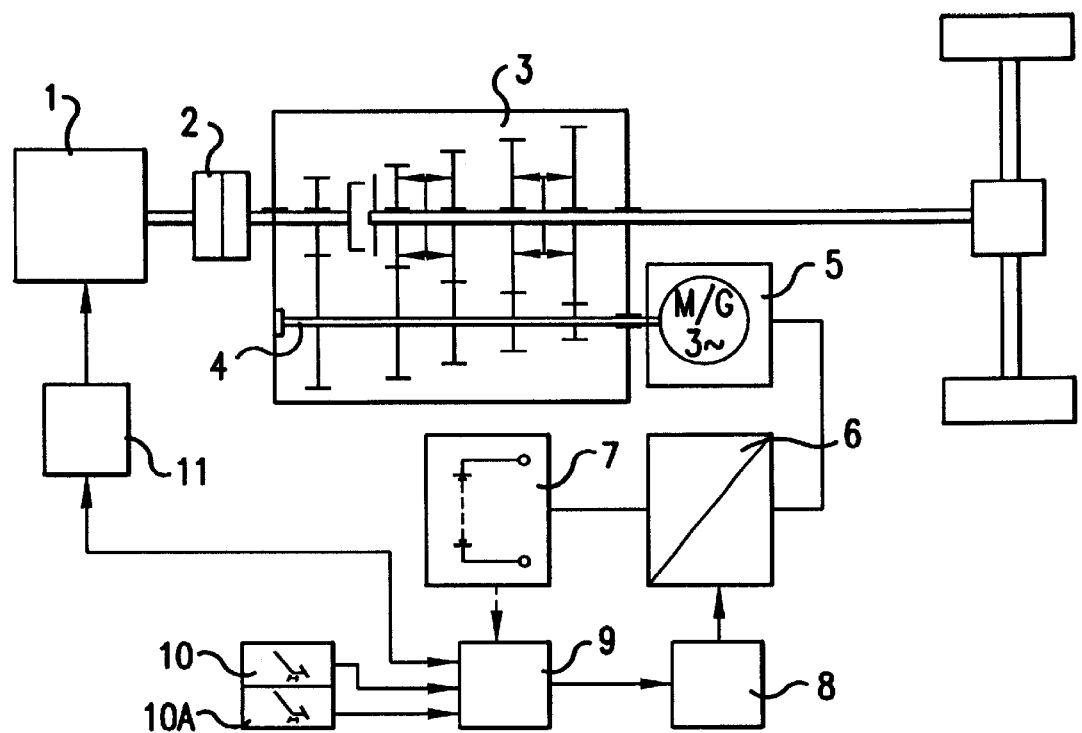
FIG. 1 is a schematic depiction of a parallel hybrid drive which can be operated by a method according to the invention.

FIG. 1 shows a parallel hybrid drive of a motor vehicle which can be operated by the method according to the invention. It has an internal combustion engine 1 (for example a reciprocating diesel engine), which is connected in a conventional manner to the input shaft of a manual transmission 3 via a clutch 2. The manual transmission 3 has a countershaft 4 which, on the one hand drives the pairs of wheels provided for the individual gear stages and, on the other hand, is connected to a three-phase machine 5. The three-phase machine 5 is connected via a three-phase converter 6 to a traction battery 7. A torque selection stage 9 receives a desired-value instruction from an accelerator pedal 10 and a brake pedal 10A, which are actuable by the vehicle driver, and thereupon activates trip logics 8 on the one hand, and an injection pump 11 on the other hand. The trip logics 8, with the aid of the three-phase converter 6, determine the extraction of energy from the traction battery and therefore also the power output of the three-phase machine 5. The injection pump 11 determines in the conventional way the supply of fuel to the internal combustion engine 1 and, to that extent, the power output of the latter. The trip logics 8 and the torque selection stage 9 thus form a control unit for the hybrid drive.

Figure 2:
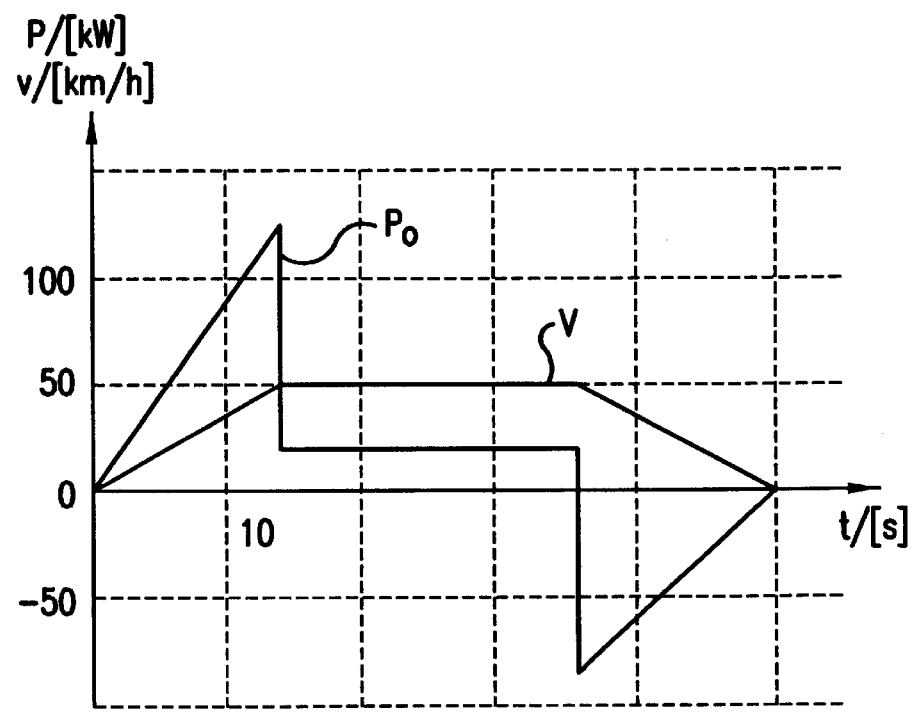
FIG. 2 is a graph which shows the time variation of speed and drive power of a motor vehicle equipped with the drive of FIG. 1, during an illustrative travel cycle of 50s between two vehicle standstill phases.
Figure 3:
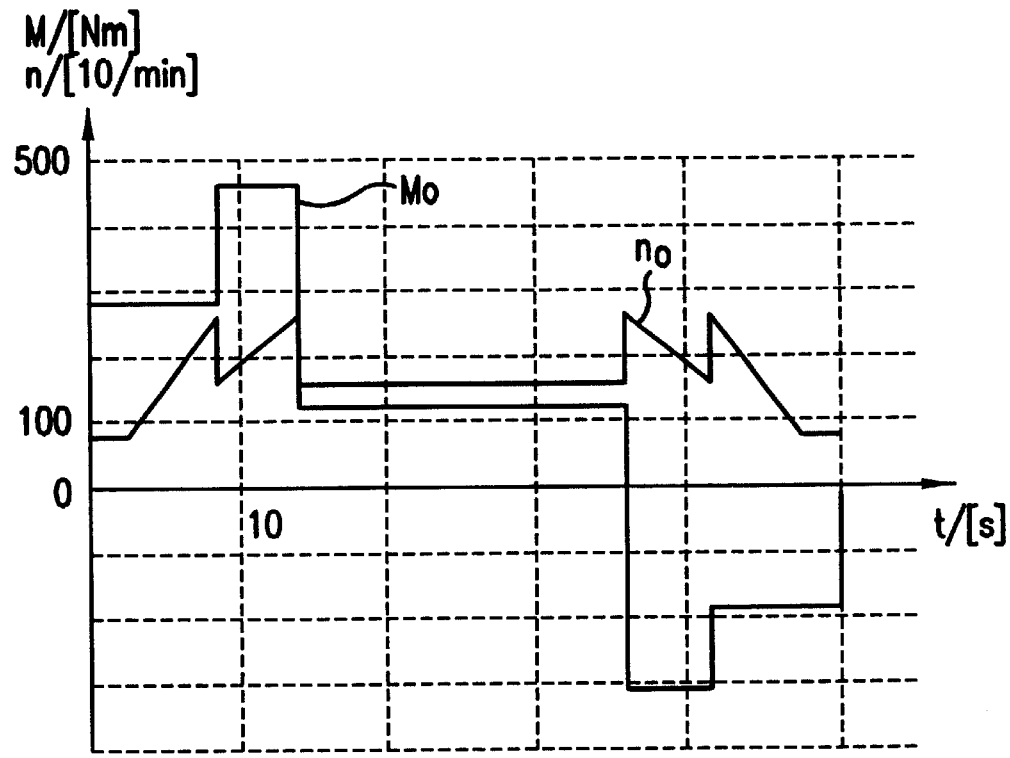
FIG. 3 shows a time profile graph of the driving torque and of the input speed at the input of a transmission of the drive of FIG. 1, during the illustrative travel time interval according to FIG. 2.
Figure 4:
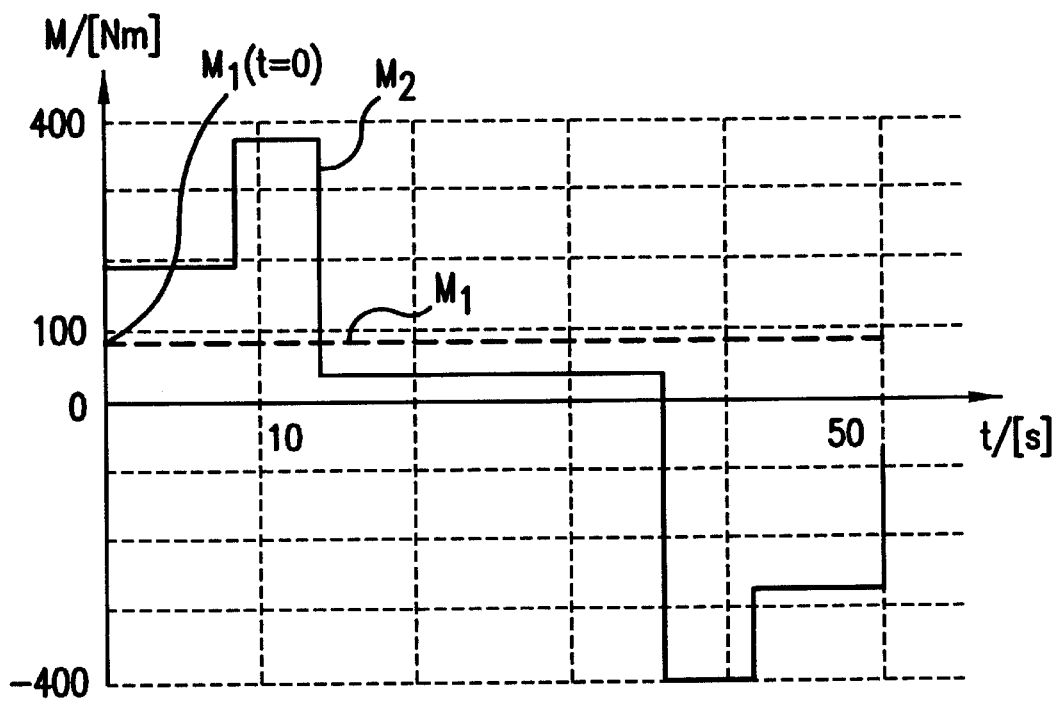
FIG. 4 is a graph of the idealized driving torques of the two drive units in FIG. 1, with the travel time interval used for averaging corresponding to the length of the entire travel cycle of 50s.

FIGS. 2 to 4 show in an idealized way an illustrative travel cycle for the vehicle equipped with the hybrid drive, during which travel cycle the drive is operated according to the invention by means of its control unit. FIG. 2 shows the speed v and the power requirement $P_0$ at the wheels of the motor vehicle having a mass of 7.5 t, a function of time t. The travel cycle embraces a timespan of 50s during which the vehicle covers a distance of around 500 m and reaches a peak speed of 50 km/h. This cycle is a typical town travel cycle, in which the vehicle moves off from a standstill, accelerates moderately, changing gear twice (FIG. 3), covers some distance at the permissible maximum speed of 50 km/h and finally breaks smoothly to a standstill.

The graph of FIG. 3 shows for the illustrative travel cycle, the torque $M_0$ at the gear input and the corresponding rotational speed $N_0$ at the gear input. Since all losses in power transmission have been ignored for the sake of clarity, the drive power $P_0$ can be calculated directly from the torque $M_0$ and the rotational speed $n_0$. Furthermore, here, the jumps in the profile of the rotational speed no in each case identify a gear change.

In the method according to the invention, which is explained in more detail below with reference to the illustrative travel cycle described, after the starting command triggered by the actuation of the accelerator pedal 10, the torque selection stage 9 determines a specific driving torque $M_1(t=0)$ which is set as starting torque on the internal combustion engine 1 via the injection pump 11. In the present example, this starting torque is around 90 Nm, as may be gathered from FIG. 4.

Thereafter, or from the point when a specific predeterminable minimum speed is reached, the torque selection stage 9 automatically determines the driving torque $M_1$ required for the internal combustion engine 1. For this purpose, in the travel cycle explained and illustrated in FIGS. 2 to 4, first the length of a subsequent travel time interval used for averaging the driving torque is fixed at 50s. In principle, the length of this travel time interval can be selected as desired, as a function of the operating characteristic map of the internal combustion engine 1, of the power output of the hybrid drive or of the driver's wish. A torque profile likely to be required for this travel time interval is then estimated and averaged in time arithmetically, after which the calculated average of the driving torque required for the travel time interval is output as power required to the internal combustion engine 1 via a corresponding setting of the injection pump 11. In the travel cycle explained, the starting torque $M_1(t=0)$ is equal to the average driving torque $M_1$ required for the entire travel cycle, as is apparent from FIG. 4.

The accelerator torque required during the initial acceleration phase of the illustrated travel cycle is assigned by the torque selection stage 9 solely to the three-phase machine as the torque $M_2$ to be provided by the latter. In this manner, in the present idealized case, if the driving torque profile $M_0$ is previously known, it becomes possible during a travel time interval to calculate an average driving torque $M_1$ which remains constant, and to assign the latter to the internal combustion engine 1 of the hybrid drive. Consequently the internal combustion engine 1 can be operated at a constant load during the entire travel time interval. At the same time, a renewed, updated averaging procedure takes place either continuously or, at the latest, towards the end of the current travel time interval.

In a case (not illustrated) in which the required driving torque can be forecasted to only a restricted extent, it is expedient to carry out averaging continuously over the torque profile of a preceding travel time interval. In this case, a torque change requirement sent to the torque selection stage 9 via the accelerator pedal 10 is then first transmitted completely to the three-phase machine 5 via the trip logics 8 and is only successively transferred to the internal combustion engine 1 via the injection pump 11 through the driving torque average which changes gradually in a way smoothed out in time. This ensures that, in a stationary travel mode (that is, with the accelerator pedal 10 kept in a constant position) the entire torque requirement of the internal combustion engine is covered, at the latest after the averaging timespan has elapsed.

In a constant travel phase of this type, the torque selection stage 9 can, if necessary, raise the engine torque $M_1$ above the driving torque $M_0$ actually required, if the charging state of the traction battery 7 falls short of a specific threshold value. The three-phase machine 5, in the generator mode, then feeds a specific fraction of the energy extracted from the traction battery 7 (on the order of 30%) back into the traction battery. This fraction may serve for compensating losses, while the actual charging energy for the traction battery 7 is fed back from the kinetic energy of the vehicle during the actuation of the brake pedal 10A. The kinetic energy of the vehicle at maximum speed may therefore be taken as the theoretical minimum quantity for dimensioning the energy content of the traction battery 7. However, in view of all the losses, approximately double the amount of this theoretical value must be assumed. If an alkaline battery is used as a traction battery 7 (as is preferable), a battery weight less than 10% of the total vehicle mass is obtained.

In a modified exemplary embodiment (not illustrated) of the method according to the invention, the torque selection stage 9 assigns a starting torque $M_1(t=0)$ for the internal combustion engine 1 with the value zero. This ensures that, until a predeterminable minimum speed is reached, the starting operation is carried out solely by the three-phase machine 5, and the internal combustion engine 1 is cut in only later. This embodiment of the method proves particularly advantageously in the cold starting of the vehicle with a low rotational speed and a high load, during which the internal combustion engine 1 is then not operated with high pollutant emission.

Due to the averaging of the driving torque demanded of the internal combustion engine as a function of the selected averaging procedure according to the invention, the internal combustion engine reacts in a desensitized manner to a torque requirement predetermined by the driver. In general only a fraction of an existing load change is covered initially by the internal combustion engine. The difference between the driving torque currently required and the driving torque delivered by the internal combustion engine is output by the three-phase machine of the hybrid drive. The three-phase machine 5 and the traction battery 7 may have relatively small dimensions, as required, since the three-phase machine needs to cover only brief fluctuations in the driving torque.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a parallel hybrid drive for a motor vehicle having an internal combustion engine connected to a drive shaft via a clutch and a manual transmission, a three-phase machine with a rotor which is directly coupled to a countershaft of the manual transmission, said three phrase machine being connected to an electrical energy storage unit via a three-phase converter, and a hybrid drive control unit, said method comprising:

said hybrid drive control unit determining a time average of driving torque required during a respective predeterminable travel time interval;

controlling power output of the internal combustion engine to output driving torque corresponding to the time average determined; and controlling power output of the three-phase machine so that it outputs driving torque corresponding to the difference between required instantaneous driving torque and driving torque delivered by the internal combustion engine.

2. The method according to claim 1, wherein the travel time interval is set as a function of at least one of emission behaviour of the internal combustion engine during load changes and a current operating state of the internal combustion engine.

3. The method according to claim 1, wherein during a travel time interval in which required driving torque is of constant magnitude and less than the full load of the internal combustion engine, and in which the energy storage unit is at least partially discharged, the hybrid drive control unit increases torque delivered by the internal combustion engine to a value which is greater than currently required driving torque required.

4. The method according to claim 1, wherein the travel time interval is set as a function of at least one of emission behaviour of the internal combustion engine during load changes and a current operating state of the internal combustion engine.

5. A method for operating a hybrid drive train for a motor vehicle having an internal combustion engine and an elecromechanical machine which are operable in parallel to propel said vehicle, said method comprising:

determining a time average for driving torque required to propel said vehicle during a predetermined time period;

controlling said internal combustion engine to generate a driving torque which is approximately equal to said time average for driving torque;

controlling said electromechanical machine to generate a driving torque which is approximately equal to the difference between a required instantaneous driving torque and driving torque generated by said internal combustion engine.

6. A method for operating a hybrid drive train for a motor vehicle according to claim 5, wherein said step of determining a time average comprises:

estimating a profile for torque which will be required during a respective time period; and averaging said estimated torque profile over said time period.

* * * * *